United States Patent
Wiles et al.

(10) Patent No.: US 8,478,476 B2
(45) Date of Patent: Jul. 2, 2013

(54) SYSTEM FOR DETECTING OPERATING ERRORS IN A VARIABLE VALVE TIMING ENGINE USING PRESSURE SENSORS

(75) Inventors: Matthew A. Wiles, Royal Oak, MI (US); Craig D. Marriott, Clawson, MI (US)

(73) Assignee: GM Global Technology Operations LLC

( * ) Notice: Subject to any disclaimer, the term of this patent is extended or adjusted under 35 U.S.C. 154(b) by 368 days.

(21) Appl. No.: 12/703,430

(22) Filed: Feb. 10, 2010

(65) Prior Publication Data

US 2011/0196567 A1    Aug. 11, 2011

(51) Int. Cl.
*G01M 17/00* (2006.01)

(52) U.S. Cl.
USPC ...... 701/29.1; 701/32.8; 701/34.4; 73/114.16

(58) Field of Classification Search
USPC .................... 701/29.1, 32.8, 33.7, 33.9, 34.4, 701/103, 111; 73/114.16, 114.17, 114.22, 73/114.26–114.28; 123/90.44, 435
See application file for complete search history.

(56) References Cited

U.S. PATENT DOCUMENTS

| | | | | |
|---|---|---|---|---|
| 6,484,694 B2 * | 11/2002 | Thomas | | 123/435 |
| 6,516,781 B2 * | 2/2003 | Weisman | | 123/435 |
| 7,254,476 B2 * | 8/2007 | Kassner | | 701/114 |
| 7,305,955 B2 * | 12/2007 | Brevick et al. | | 123/179.21 |
| 7,387,018 B2 | 6/2008 | Wiles | | |
| 7,444,236 B2 | 10/2008 | Wiles | | |
| 2007/0204821 A1 * | 9/2007 | Aoyama et al. | | 123/90.16 |

* cited by examiner

*Primary Examiner* — Michael McCullough

(57) ABSTRACT

A method and control module includes a pressure sensor data comparison module that compares measured pressure volume signal segments to ideal pressure volume segments. A valve actuation hardware remedy module performs a hardware remedy in response to comparing the measured pressure volume signal segments to the ideal pressure volume segments when a valve actuation hardware failure is detected.

16 Claims, 9 Drawing Sheets

SYSTEM FOR DETECTING OPERATING ERRORS IN A VARIABLE VALVE TIMING ENGINE USING PRESSURE SENSORS

STATEMENT OF GOVERNMENT RIGHTS

This invention was produced pursuant to U.S. Government Contract No. DE-FC26-05NT42415 with the Department of Energy (DoE). The U.S. Government has certain rights in this invention.

FIELD OF THE DISCLOSURE

The present disclosure relates to variable valve actuation systems, and more particularly to systems for reducing errors in operating variable valve actuation systems.

BACKGROUND OF THE DISCLOSURE

The statements in this section merely provide background information related to the present disclosure and may not constitute prior art.

Vehicles include an internal combustion engine that generates drive torque. More specifically, an intake valve is selectively opened to draw air into the cylinders of the engine. The air is mixed with fuel to form a combustion mixture. The combustion mixture is compressed within the cylinders and is combusted to drive pistons within the cylinders. An exhaust valve selectively opens to allow the exhaust gas to exit from the cylinders after combustion.

A rotating camshaft regulates the opening and closing of the intake and exhaust valves. The camshaft includes a plurality of cam lobes that rotate with the camshaft. The profile of the cam lobe determines the valve lift schedule. More specifically, the valve lift schedule includes the amount of time the valve is open (duration) and the magnitude or degree to which the valve opens (lift).

Variable valve actuation (VVA) technology improves fuel economy, engine efficiency, and/or performance by modifying a valve lift event, timing, and duration as a function of engine operating conditions. Two-step VVA systems include variable valve assemblies such as hydraulically-controlled switchable roller finger followers (SRFFs). SRFFs enable two discrete valve states (e.g., a low-lift state or a high-lift state) on the intake and/or exhaust valves.

Referring to FIG. 1, a hydraulic lift mechanism (i.e., an SRFF mechanism) 10 is shown in more detail. Those skilled in the art can appreciate that the SRFF mechanism 10 is merely exemplary in nature. The SRFF mechanism 10 is pivotally mounted on a hydraulic lash adjuster 12 and contacts the valve stem 14 of an inlet valve 16 that selectively opens and closes an inlet passage 18 to a cylinder 20. The engine inlet valve 16 is selectively lifted and lowered in response to rotation of an inlet camshaft 22 on which multiple cam lobes (e.g., low-lift cam lobe 24 and high-lift cam lobe 26) are mounted. The inlet camshaft 22 rotates about an inlet camshaft axis 28. Although the exemplary embodiment describes the SRFF mechanism 10 operating on the engine inlet valve 16, those skilled in the art can appreciate that an SRFF mechanism may operate similarly on an exhaust valve 30. Such as the configuration required to enable an HCCI operating regime.

A control module transitions an SRFF mechanism from a low-lift state to a high-lift state, and vice versa, based on demanded engine speed and load. For example, an internal combustion engine operating at an elevated engine speed, such as 4,000 revolutions per minute (RPMs), typically requires the SRFF mechanism to operate in a high-lift state to maintain valvetrain stability.

Hydraulic cam phaser movement and positioning is achieved by controlling the flow of oil to the cam actuator, such as a phaser. The flow control is done with a valve capable of supplying oil to a volume on one side of a vane in a phaser while simultaneously providing a path for the volume on the other side of the vane to vent or return to a tank. The rate of oil flow is a function of the area of the flow port that is exposed. The control of the flow is achieved by varying the amount of force applied to the valve spool, which may be obtained from a solenoid.

As mentioned above, a two-step SRFF may have a maximum speed of operation in the low-lift state. The inertia of the mechanism operating the low-lift state above the maximum engine speed will exceed the spring force, which maintains the contact between the SRFF and the cam lobe. The resulting separation between the SRFF and the cam may eventually fatigue the parts and cause damage. Preventing damage increases the durability of the engine.

SUMMARY

The present disclosure provides a diagnostic method to recognize valve actuation failure and take remedial action to prevent engine hardware damage.

In one aspect of the disclosure, a method includes generating a cylinder pressure sensor signal, comparing an ideal combustion pressure signal to the cylinder pressure signal and performing a valve actuation hardware remedy in response to comparing ideal combustion pressure signal to the cylinder pressure signal.

In another aspect of the disclosure, a control module includes a pressure sensor data comparison module that compares measured pressure volume signal segments to ideal pressure volume segments. A valve actuation hardware remedy module performs a hardware remedy in response to comparing the measured pressure volume signal segments to the ideal pressure volume segments.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
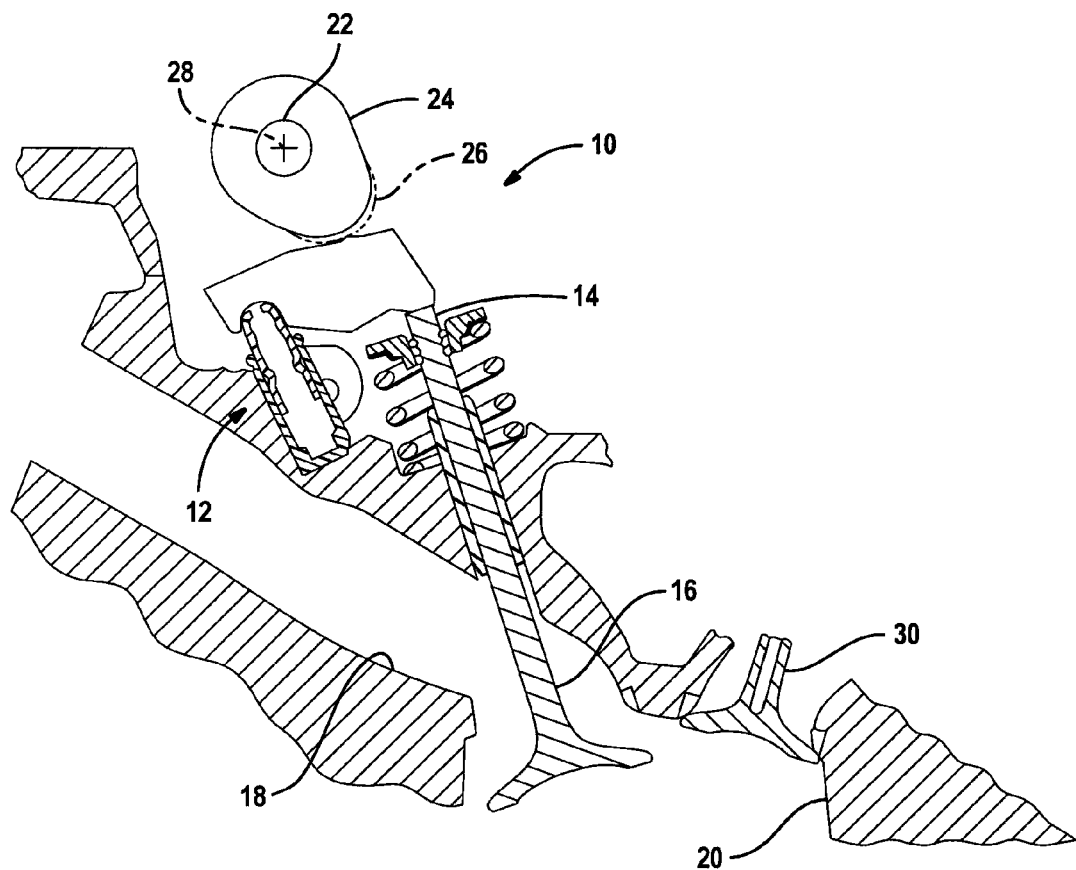
FIG. 1 is a cross-sectional view of an exemplary hydraulic lift mechanism according to the prior art.

The following description of the preferred embodiment is merely exemplary in nature and is in no way intended to limit the disclosure, its application, or uses. For purposes of clarity, the same reference numbers will be used in the drawings to identify similar elements. As used herein, "activated" refers to operation using all of the engine cylinders. "Deactivated" refers to operation using less than all of the cylinders of the engine (one or more cylinders not active). As used herein, the term "module" refers to an application specific integrated circuit (ASIC), an electronic circuit, a processor (shared, dedicated, or group) and memory that execute one or more software or firmware programs, a combinational logic circuit, or other suitable hardware components that provide the described functionality.

The present description is provided with respect to a four-valve-per-cylinder configuration. The disclosure applies to 2 and 3 valves per cylinder engines as well.

Figure 2:
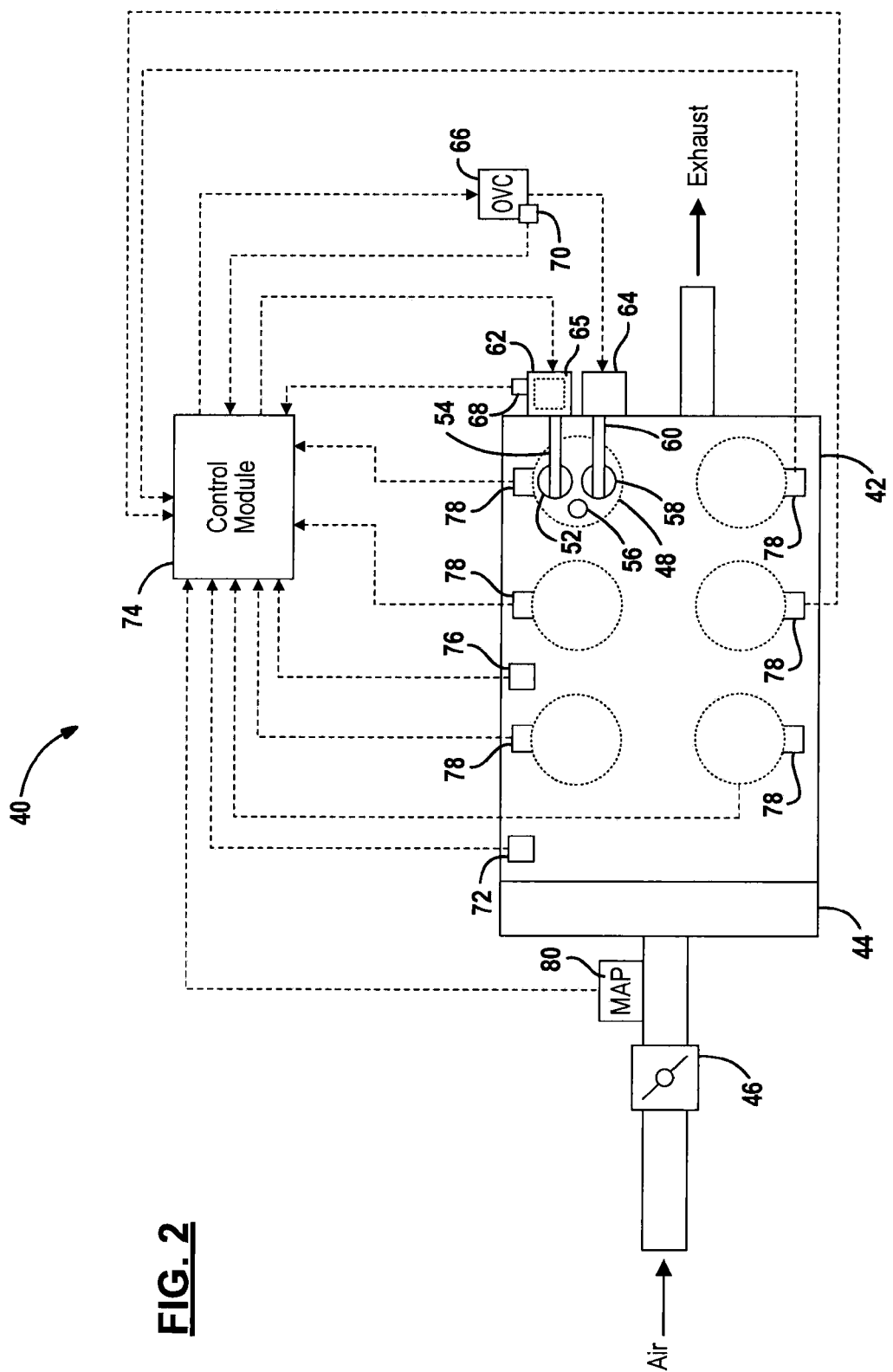
FIG. 2 is a functional block diagram of an exemplary vehicle including a control system according to the present disclosure.

Referring now to FIG. 2, an engine system 40 includes an engine 42 that combusts an air and fuel mixture to produce drive torque. The engine 42 may be a homogeneous charge compression ignition (HCCI) engine. Air is drawn into an intake manifold 44 through a throttle 46. The throttle 46 regulates mass air flow into the intake manifold 44. Air within the intake manifold 44 is distributed into cylinders 48. Although six cylinders 48 are illustrated, it is appreciated that the diagnostic system of the present disclosure can be implemented in engines having a plurality of cylinders including, but not limited to, 2, 3, 4, 5, 8, 10, and 12 cylinders.

A fuel injector (not shown) injects fuel into the engine. The fuel injection may inject fuel directly into the cylinder or into the intake manifold. The fuel injector may be an injector associated with an electronic or mechanical fuel injection system, a jet or port of a carburetor or another system for mixing fuel with intake air. The fuel injector is controlled to provide a desired air-to-fuel (A/F) ratio for fueling the engine.

An intake valve 52 selectively opens and closes to enable the air/fuel mixture to enter the cylinder 48. The intake valve position is regulated by an intake camshaft 54. A piston (not shown) compresses the air/fuel mixture within the cylinder 48. More than one intake valve per cylinder may be provided.

A spark plug 56 initiates combustion of the air/fuel mixture, driving the piston in the cylinder 48. The piston drives a crankshaft (not shown) to produce drive torque. Combustion exhaust within the cylinder 48 is forced out an exhaust port when an exhaust valve 58 is in an open position. More than one exhaust valve per cylinder may be provided. The exhaust valve position is regulated by an exhaust camshaft 60. The exhaust is treated in an exhaust system. Although single intake and exhaust valves 52 and 58 are illustrated, it can be appreciated that the engine 42 can include multiple intake and exhaust valves 52 and 58 per cylinder 48.

The engine system 40 may include an intake cam phaser 62 and an exhaust cam phaser 64 that respectively regulate the rotational timing of the intake and exhaust camshafts 54 and 60. More specifically, the timing or phase angle of the respective intake and exhaust camshafts 54 and 60 can be retarded or advanced with respect to each other or with respect to a location of the piston within the cylinder 48 or with respect to crankshaft position.

In this manner, the position of the intake and exhaust valves 52 and 58 can be regulated with respect to each other or with respect to a location of the piston within the cylinder 48. By regulating the position of the intake valve 52 and the exhaust valve 58, the quantity of air/fuel mixture ingested into the cylinder 48, and therefore the engine torque, is regulated.

The cam phaser 62 can include a phaser actuator 65 that is either electrically or hydraulically actuated. Hydraulically-actuated phaser actuators 65, for example, include an electrically-controlled fluid control valve, such as an oil control valve (OCV) 66 that controls a fluid supply flowing into or out of the phaser actuator 65.

Additionally, low-lift cam lobes (not shown) and high-lift cam lobes (not shown) are mounted to each of the intake and exhaust camshafts 54, 60. The low-lift cam lobes and high-lift cam lobes rotate with the intake and exhaust camshafts 54 and 60 and are in operative contact with a hydraulic lift mechanism, such as a switching roller finger follower (SRFF) mechanism as depicted in FIG. 1. Typically, distinct SRFF mechanisms operate on each of the intake and exhaust valves 52 and 58 of each cylinder 48. In the present implementation, each cylinder 48 includes two SRFF mechanisms.

Each SRFF mechanism provides two levels of valve lift for one of the intake and exhaust valves 52 and 58. The two levels of valve lift include a low lift and high lift and are based on the low-lift cam lobes and high-lift cam lobes, respectively. During low-lift operation (i.e., a low-lift state), a low-lift cam lobe causes the SRFF mechanism to pivot to a second path in accordance with the prescribed geometry of the low-lift cam lobe and thereby open one of the intake and exhaust valves 52 and 58 a first predetermined amount. During high-lift operation (i.e., a high-lift state), a high-lift cam lobe causes the SRFF mechanism to pivot to another path in accordance with the prescribed geometry of the high-lift cam lobe and thereby opening one of the intake and exhaust valves 52 and 58 to open a second predetermined amount greater than the first predetermined amount.

The valve actuator hardware includes, but is not limited to, the cams, SRFF, OCV, and phasers. A position sensor 68 senses a position of the cam phaser 62 and generates a cam phaser position signal indicative of the position of the cam phaser 62. A pressure sensor 70 generates a pressure signal indicating a pressure of the fluid supply supplied to the phaser actuator 65 of the cam phaser 62. The pressure sensor 70 may be optional. An engine speed and position sensor 72 is responsive to a rotational speed of the engine 42 and generates an engine speed signal in revolutions per minute (RPM). The position of the crankshaft may also be determined by sensor 72.

A control module 74 includes a processor and memory, such as random access memory (RAM), read-only memory (ROM), and/or other suitable electronic storage. The control module 74 communicates with the position sensor 68, the pressure sensor 70, and the engine speed and position sensor 72. The control module 74 may receive input from other sensors 76 of the exemplary vehicle including, but not limited to, oxygen sensors and/or engine coolant temperature sensors.

An in-cylinder pressure sensor 78 may be disposed within each cylinder of the engine 42. The in-cylinder pressure sensor 78 generates signals corresponding to the pressure in each cylinder. The pressure sensors 78, as will be described below, may be used to determine a hardware failure for an SRFF or a failure of the OCV. As is set forth below, the electrical signals corresponding to pressures may be directly used or processed to determine hardware faults.

The control module 74 executes a diagnostic system of the present disclosure. The diagnostic system detects a failure state of one or more of the SRFF mechanisms of the engine 42 or of the OCV 66 associated therewith based at least on the pressure sensor signals. More specifically, the diagnostic system identifies one of the cylinders 48 associated with the failed SRFF mechanism or OCV, thereby enabling the control module 74 to command remedial actions (e.g., limiting engine speed) in order to prevent damage to the engine 42.

A manifold absolute pressure (MAP) sensor 80 may be used to generate an MAP signal, which is communicated to the control module 74. By determining the MAP that corresponds to each cylinder, a failure of the SRFF may be determined in high speed intake failures.

Figure 3:
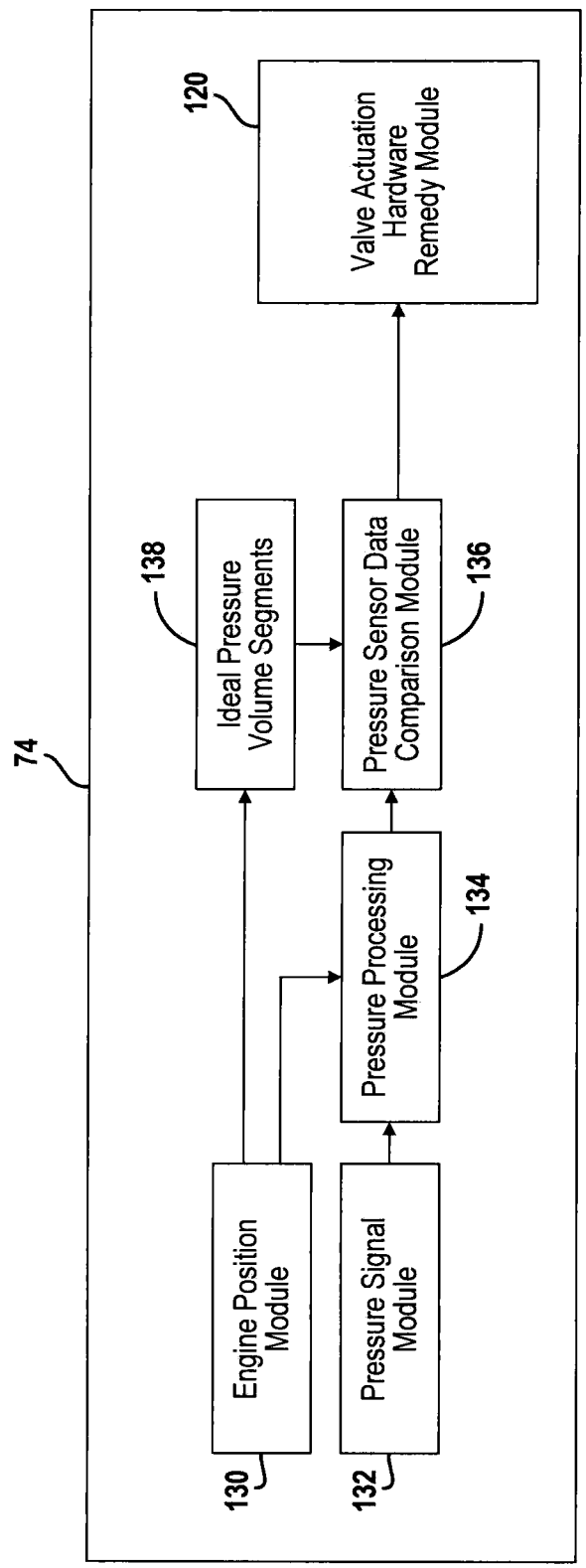
FIG. 3 is a detailed block diagrammatic representation of the control module 74.

Referring now to FIG. 3, the control module 74 is illustrated in further detail. The output of the control module 74 may be generated from a valve actuation hardware remedy module 120. The valve actuation hardware remedy module 120 may reduce the engine speed to prevent damage to the valve actuation hardware.

An engine position module 130 may generate an engine position signal corresponding to the position of the crankshaft. The engine position module 130 may allow selective processing for various segments of the combustion cycle.

A pressure signal module 132 may be provided to the pressure processing module 134. The pressure processing module 134 may process the pressure signals, such as filtering the pressure sensor signals.

The output of the pressure processing module 134 may be provided to a pressure sensor data comparison module 136. The pressure sensor data comparison module 136 may compare the processed pressure sensor data to ideal pressure sensor segments from a pressure volume segment memory 138. The ideal pressure volume segments may be predetermined and stored within the memory during vehicle build. The predetermined ideal pressure volume segments may be calibrated during vehicle development.

The output of the pressure sensor data comparison module 136 is provided to the valve actuation hardware remedy module 120. When the pressure sensor data exceeds a hardware fault threshold, for example, a problem indicative of an SRFF error such as failure to enter a high lift state or a low lift state or OCV error may be present.

Figure 4:
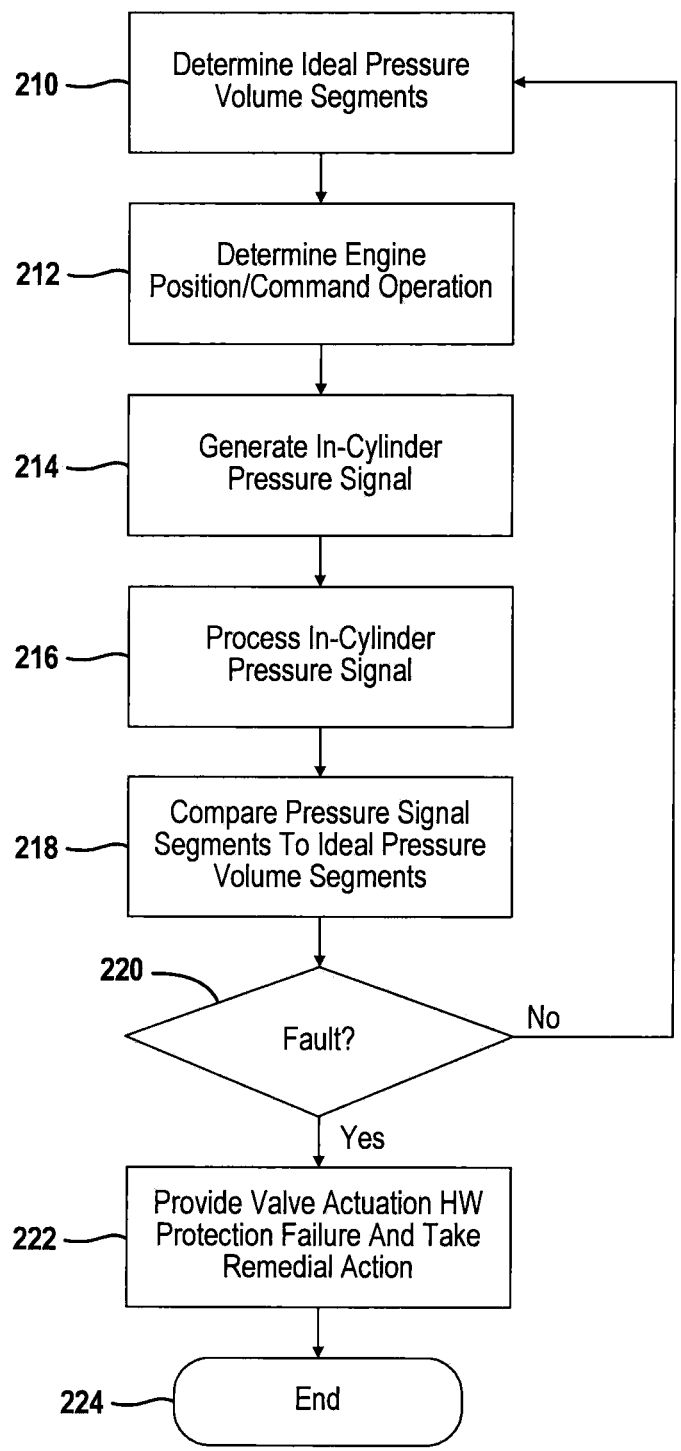
FIG. 4 is a flowchart of a method for protecting the hardware according to the present disclosure.

Referring now to FIG. 4, a non-intrusive method for hardware protection is set forth. In step 210, ideal pressure volume segments are determined. The ideal pressure volume segments correspond to various segments of the combustion process and thus correspond to engine position. The ideal segments may be stored into a memory during building of the vehicle. The ideal pressure volume segments may be ideal pressure volume segments without hardware faults such as high-lift state entry or low-lift state entry failures. In step 212, the engine position is determined. The engine position should correspond to a commanded operation position should the engine be operating properly. In step 214, the signals are obtained from the in-cylinder pressure signals. In step 216, the in-cylinder pressure signals may be processed by filtering or other processing. The in-cylinder pressure signals may be correlated with the swept volume that is determined from the engine position in step 212.

In step 218, the pressure signals, whether processed or not, are compared to the ideal pressure volume segments. In step 220, if the comparison does not indicate a fault, step 210 is again performed. In step 220, if the comparison indicates a fault, step 222 may be performed. A fault may be indicated in step 220 by a variance from the ideal pressure volume segments. Of course, a certain amount of variance may take place during normal operation in the engine. However, a fault will be manifested by a clear variance from the ideal pressure volume segment. Identification of the pattern of variance may allow a determination as to the type of fault as will be illustrated below.

In step 222, a valve actuation hardware protection failure remedial action may be performed. One remedial action is to reduce the engine speed until a failure is no longer detected. In step 224, the method ends.

Figure 5:
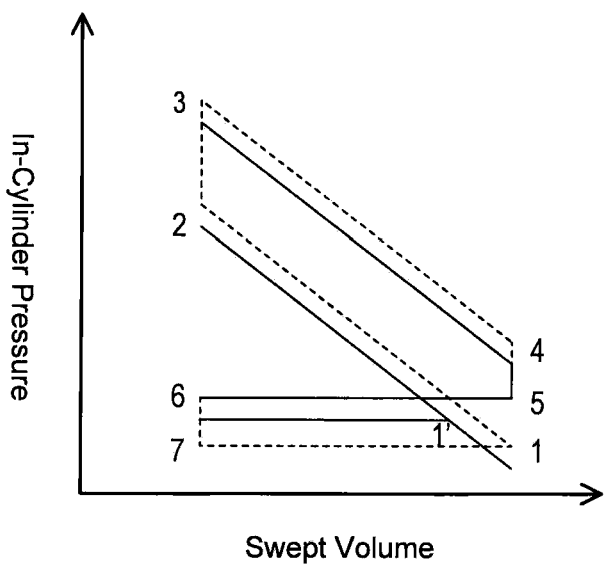
FIG. 5 is a plot of in-cylinder pressure versus swept volume of an engine operating properly in high-lift conditions and low-lift conditions for an early intake valve closing condition.

Referring now to FIG. 5, a plot of two ideal air standard open cycle representations of a throttled Otto cycle engine is illustrated. The dashed line represents both intake switchable roller finger followers being successfully configured for high-lift operation. The solid line represents a plot when both switchable roller finger followers are successfully configured for low-lift operation. This operation corresponds to early intake valve closing (EIVC).

Figure 6:
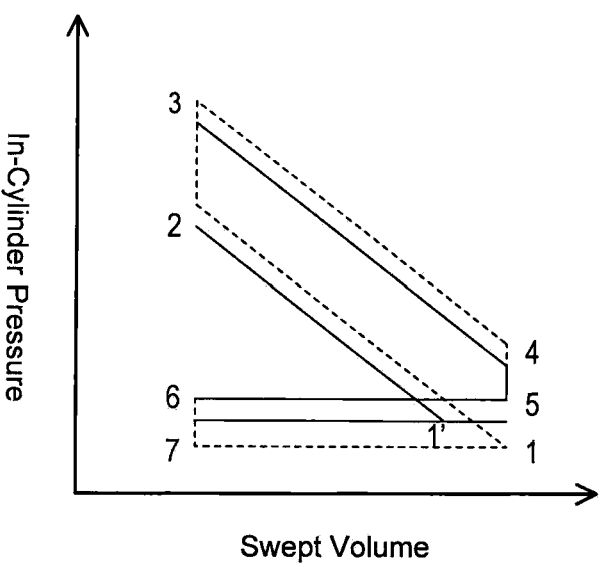
FIG. 6 is a cylinder pressure versus swept volume plot for proper low-lift and high-lift states in a late intake valve closing condition.

Referring now to FIG. 6, a plot similar to that illustrated in FIG. 5 is set forth with respect to a late intake valve closing (LIVC) scenario. In FIG. 6, the dashed line illustrates both switchable roller finger followers being successfully configured for nominal lift operation and the solid illustrates the valve train when at least one switchable roller finger follower is successfully configured for low-lift operation.

Figure 7:
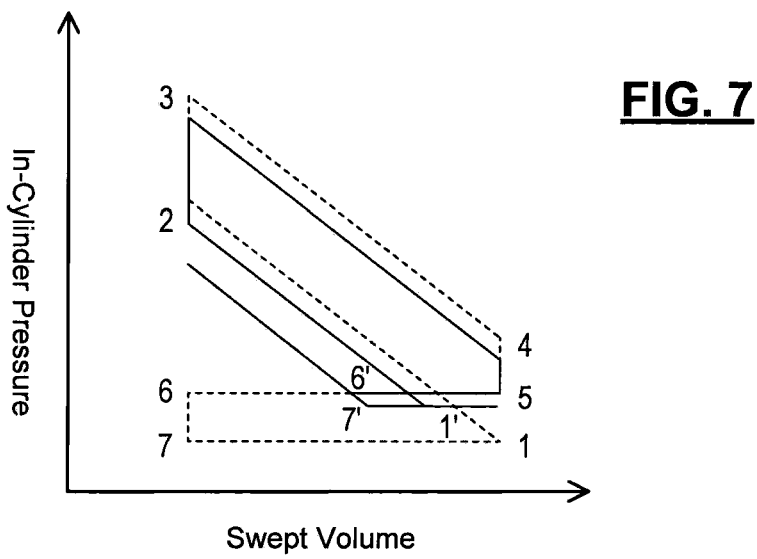
FIG. 7 is a cylinder pressure versus swept volume plot of a standard throttled auto-cycle engine.

Referring now to FIG. 7, a plot for HCCI operation of the engine is set forth. The dashed line illustrates both intake and exhaust switchable roller finger followers being successfully configured for high-life operation. The solid line illustrates when both intake and exhaust switchable roller finger followers are successfully configured for low-lift operation.

Figure 8:
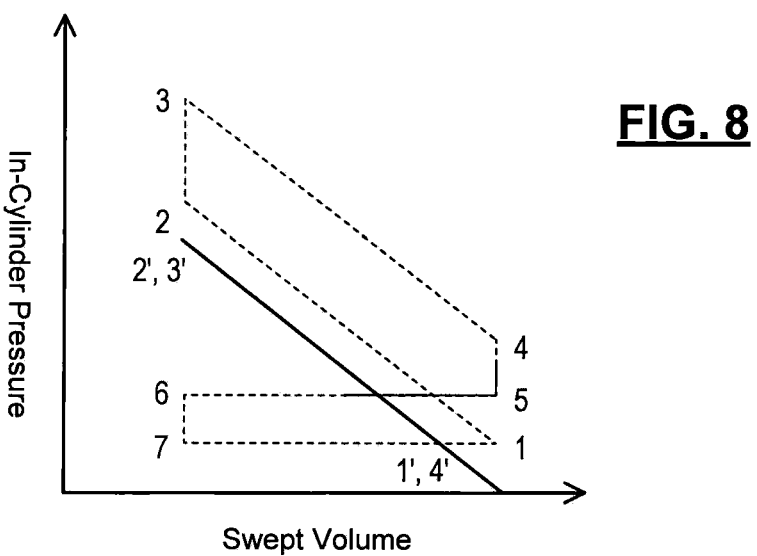
FIG. 8 is a cylinder pressure versus swept volume plot of proper high-lift operation in an active fuel management condition.

Referring now to FIG. 8, a plot for active fuel management (AFM) for overhead camshaft applications is set forth. The dashed line represents both intake and exhaust switchable roller finger followers being successfully configured for high-lift operation. The solid line illustrates ideal operation when the valve train has both intake and switchable roller finger followers in a no-lift condition.

Various failure modes may be detected in the disclosure such as single low-lift/no-lift failure when high-lift is commanded, single high-lift failure when low-lift or no-lift is commanded, dual low-lift/no-lift failure when high-lift is commanded or dual high-lift failure when low-lift/no-lift is commanded.

Figure 9:
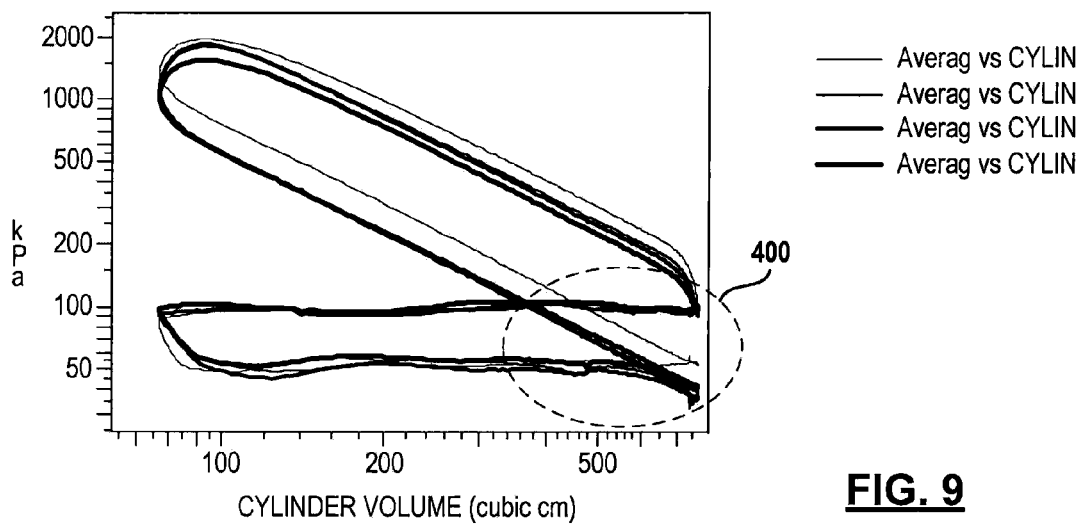
FIG. 9 is a data plot corresponding to a single low-lift failure when a high-lift state is commanded in an early intake valve closing condition.

Referring now to FIG. 9, a single low-lift failure when high-lift is commanded is illustrated using data from in-cylinder pressure sensors. By comparing the plot to that illustrated in FIG. 5, the alignment of the signals does not align, particularly in the circled area 400.

Figure 10:
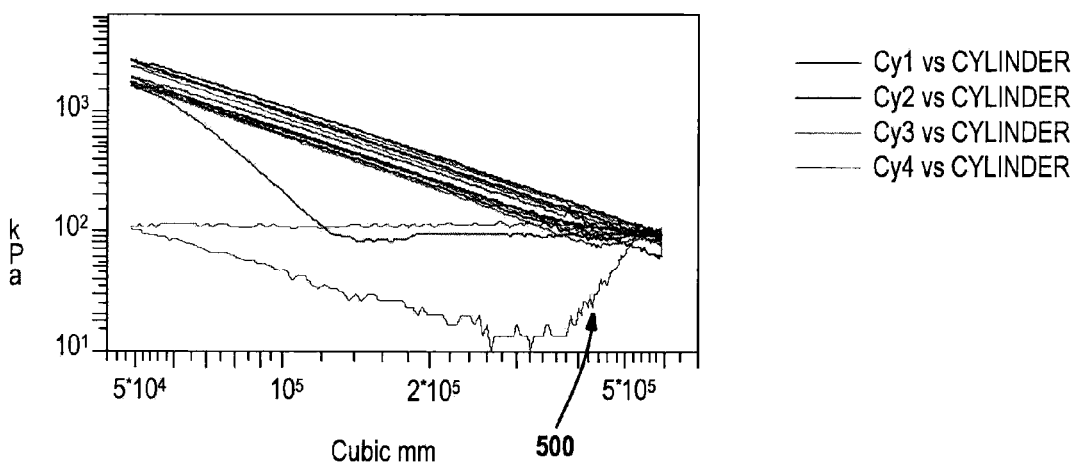
FIG. 10 is a plot of pressure versus swept volume of a single high-lift failure when a low-lift state is commanded during HCCI operation.

Referring now to FIG. 10, a plot for a single high-lift failure when low-lift is commanded in HCCI mode is set forth. As can be seen by the lower portion of the plot illustrated near arrow 500, the alignment as compared to FIG. 7 does not correspond. Therefore, the high-life failure is illustrated by the following plot.

Figure 11:
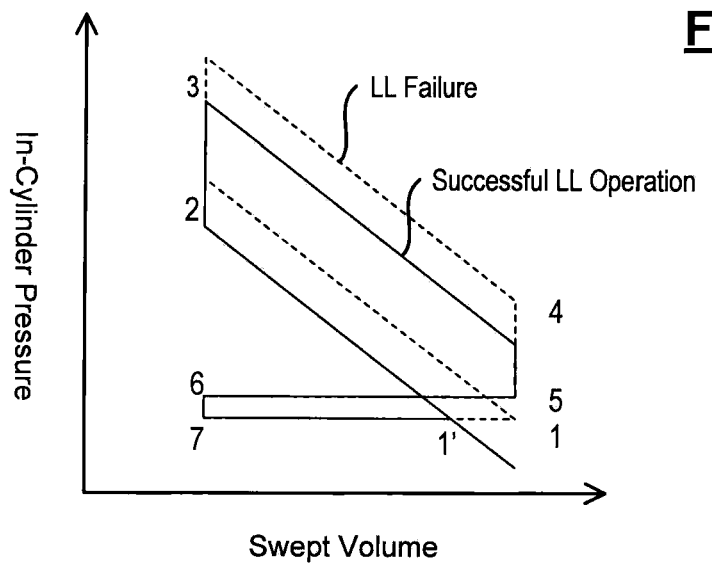
FIG. 11 is a plot of cylinder pressure versus swept volume for a throttled auto cycle engine when one or more switchable roller finger follower is in high-lift when a low-lift state is commanded.
Figure 12:
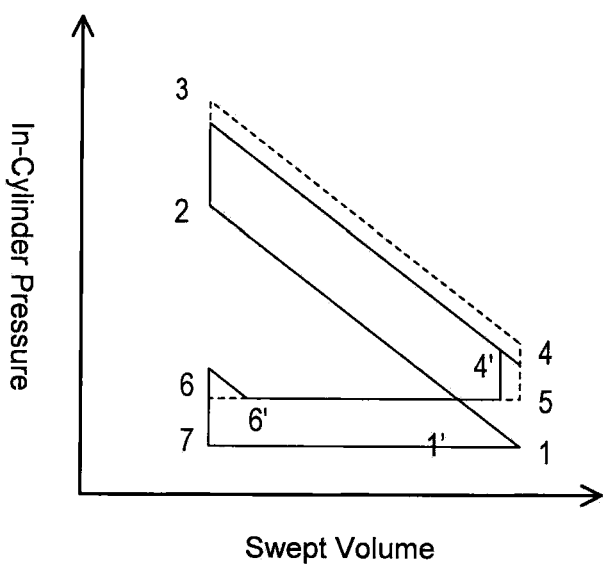
FIG. 12 is a plot of in-cylinder pressure versus swept volume of an exhaust only switchable roller finger follower when one or more switchable roller finger follower is in high-lift state when low-lift is commanded.

Referring now to FIG. 11, the dashed line illustrates a low-lift failure and the solid line illustrates a successful low-lift operation. As can be seen, the low-lift operation failure is displaced from that of a successful low-lift operation. FIG. 11 corresponds to one intake only switchable roller finger follower error.

Figure 13:
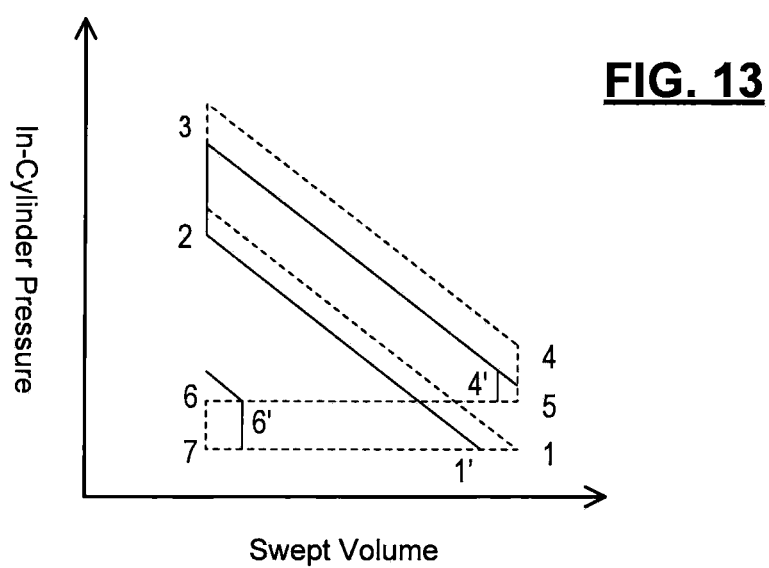
FIG. 13 is a plot of in-cylinder pressure versus swept volume plot of both exhaust and intake switchable roller finger follower failure.

FIG. 13 illustrates an exhaust-only switchable roller finger follower error in dashed lines while a successful exhaust-only switchable roller finger follower is illustrated by the solid lines.

Referring now to FIG. 13, the dashed line represents both exhaust and intake switchable roller finger follower failures when low-lift and high-lift is commanded.

It should be noted by the above that when a single low-lift failure occurs on the exhaust side of the engine, in-cylinder pressure during the exhaust portion of the cycle will likely be elevated. The switchable roller finger follower failure on the exhaust can be made more detectable by advancing the exhaust camshaft earlier such that the piston velocity is greater than around exhaust valve closing (EVC). This failure may be detectable using PMEP, fired IMEP, fired coefficient of variation (COV) of IMEP or other metrics of the cylinder pressure signal.

A single low-lift switchable roller finger follower failure on the intake side of the engine may be detected using similar logic. Mass flow into the engine may be restricted causing the in-cylinder pressure to be less than the nominal operating condition during pumping portions of the pressure volume diagram. Additionally, if phased such, the reduction in inducted mass may be seen by examining the peak cylinder pressure while monitoring and/or by looking at the comparatively reduced IMEP during firing conditions. Advancing or retarding the intake camshaft may aid the single intake low-lift failure by causing an effective compression ratio due to choked mass conditions that may occur around the effective early or late intake valve closings. The failure may be detected using PMEP, fired IMEP or the individual air fuel ratio deviations. Gross differences in long- and short-term fueling correction factors may also manifest the changes.

When a pair of switchable roller finger follower failures occurs on both intake valves of a cylinder, the dual intake switchable roller finger follower low-lift failures may cause major recompression with intake popping blow-down during the IVO event.

High-lift failures may also be detected. In general, high-lift failures will not support HCCI operation due to the loss of trapped residual or incorrect fueling conditions. An exhaust high-lift failure may cause a total loss of HCCI exhaust trapping without intake blow-down during the IVO event or with a large discrepancy in PMEP. For dual high-lift failures, a single high-lift failure and dual high-lift failure may be detected in the same way.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method comprising:
measuring, using a pressure signal module, cylinder pressures at a plurality of points of a combustion cycle;
retrieving, using a pressure sensor data comparison module, predetermined cylinder pressures for the plurality of points from memory;
comparing, using the pressure sensor data comparison module, the predetermined cylinder pressures to the measured cylinder pressures;
determining, using the pressure sensor data comparison module, variances based on the measured cylinder pressures and the predetermined cylinder pressures;
selectively, using a valve actuation hardware remedy module, diagnosing a fault in a switchable roller finger follower (SRFF) mechanism based on the variances; and
performing, using the valve actuation hardware remedy module, a valve actuation hardware remedy in response to the fault in the SRFF mechanism.

2. A method as recited in claim 1 wherein measuring the cylinder pressures comprises measuring the cylinder pressures based on an in-cylinder pressure signal from a cylinder pressure sensor.

3. A method as recited in claim 1 further comprising determining measured pressure volume segments based on the measured cylinder pressures.

4. A method as recited in claim 3 further comprising:
determining an engine position; and
determining the measured pressure volume segments further based on the engine position.

5. A method as recited in claim 4 further comprising:
determining an engine temperature; and
determining the measured pressure volume segments further based on the engine temperature.

6. A method as recited in claim 5 wherein determining the engine position comprises determining a crankshaft angle window.

7. A method as recited in claim 1 further comprising filtering the measured cylinder pressures before the comparison.

8. A method as recited in claim 1 wherein the valve actuation hardware remedy comprises reducing an engine speed.

9. A method as recited in claim 1 further comprising indicating that the SRFF mechanism is stuck in a high lift state.

10. A method as recited in claim 1 further comprising indicating that the SRFF mechanism is stuck in a low lift state.

11. A control module comprising:
a pressure signal module that generates measured cylinder pressures at a plurality of points of a combustion cycle;
a pressure sensor data comparison module that retrieves predetermined cylinder pressures for the plurality of points from memory, that compares the measured cylinder pressures to the predetermined pressures, and that determines variances based on the measured cylinder pressures and the predetermined cylinder pressures; and
a valve actuation hardware remedy module that selectively diagnoses a fault in a switchable roller finger follower (SRFF) mechanism based on the variances and that performs a hardware actuation remedy in response to the fault in the SRFF mechanism.

12. A control module as recited in claim 11 further comprising a pressure processing module that filters the measured cylinder pressures before the comparison.

13. A control module as recited in claim 11 further comprising an engine position module that determines an engine position, wherein the pressure sensor data comparison module determines measured pressure volume segments based on the engine position and the measured cylinder pressures.

14. A control module as recited in claim 13 wherein the pressure sensor data comparison module determines the measured pressure volume segments further based on an engine temperature.

15. A control module as recited in claim 12 wherein, based on the variances, the valve actuation hardware remedy module selectively indicates that the SRFF mechanism is stuck in one of a high lift state and a low lift state.

16. A control module as recited in claim 11 wherein, in response to the fault in the SRFF mechanism, the valve actuation hardware remedy module reduces engine speed.

* * * * *